US008687787B2

(12) United States Patent
Stille et al.

(10) Patent No.: US 8,687,787 B2
(45) Date of Patent: Apr. 1, 2014

(54) METHOD AND ARRANGEMENT FOR MAKING A CALL-SETUP

(75) Inventors: Mats Stille, Bromma (SE); Jan Hultkrantz, Bromma (SE); Ulf Olsson, Sollentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1523 days.

(21) Appl. No.: 11/917,524

(22) PCT Filed: Jun. 19, 2006

(86) PCT No.: PCT/SE2006/000740
§ 371 (c)(1),
(2), (4) Date: Dec. 14, 2007

(87) PCT Pub. No.: WO2006/137781
PCT Pub. Date: Dec. 28, 2006

(65) Prior Publication Data
US 2011/0150203 A1  Jun. 23, 2011

(30) Foreign Application Priority Data
Jun. 20, 2005  (SE) .................................. 0501419

(51) Int. Cl.
*H04M 3/42*  (2006.01)
(52) U.S. Cl.
USPC .................................. 379/207.16; 379/88.17

(58) Field of Classification Search
USPC ................... 379/207.16, 88, 17, 33
See application file for complete search history.

(56) References Cited

U.S. PATENT DOCUMENTS

| | | | |
|---|---|---|---|
| 7,184,532 B2 * | 2/2007 | Creamer et al. | 379/207.08 |
| 7,889,853 B2 * | 2/2011 | Sutcliffe | 379/207.16 |
| 2002/0021696 A1 * | 2/2002 | Minborg | 370/392 |
| 2007/0123311 A1 * | 5/2007 | Kim et al. | 455/567 |

FOREIGN PATENT DOCUMENTS

| | | | |
|---|---|---|---|
| JP | 2002-158777 A | 5/2002 | |
| JP | 2003-188992 A | 7/2003 | |
| JP | 2005-101927 A | 4/2005 | |
| WO | WO 2004084566 A1 | 9/2004 | |

* cited by examiner

*Primary Examiner* — Amal Zenati

(57) ABSTRACT

A method and arrangement for providing a ring-back presentation to a calling terminal after receiving a call setup request from the calling terminal (A) for a first communication session (308) with a called terminal (B). A second packet-based communication session (310) is established with the calling terminal, independent of the first session, and pre-defined media content is provided as said ring-back presentation (312) to the calling terminal over the second session. Thereby, ring-back presentations to waiting callers can be selected from a great range of media types, including visual media. A calling user can also control the playout or display of the ring-back presentation irrespective of when the call is answered.

19 Claims, 8 Drawing Sheets

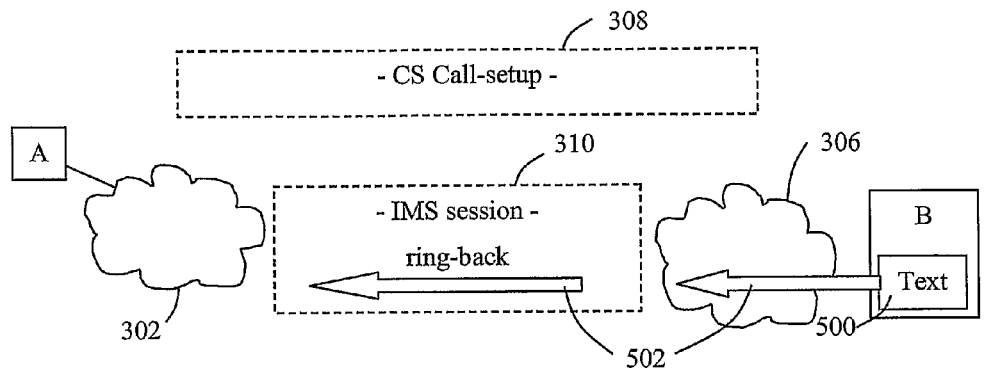
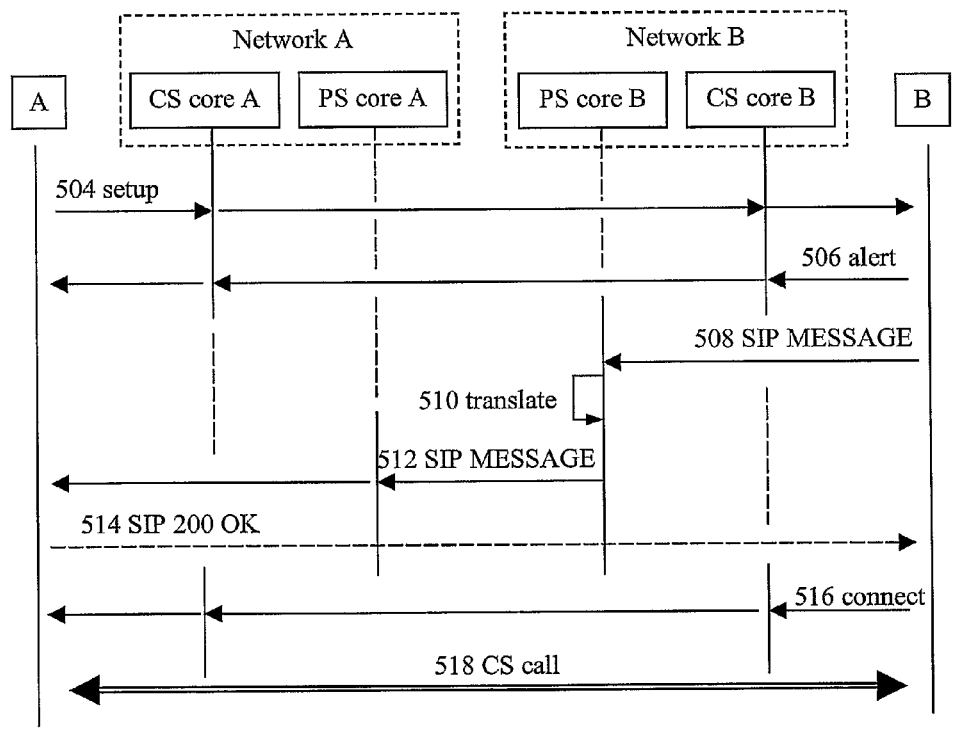
Fig. 5a
Fig. 5b

METHOD AND ARRANGEMENT FOR MAKING A CALL-SETUP

TECHNICAL FIELD

The present invention relates generally to a method and arrangement for setting up a call using a ring-back function. In particular, the invention provides a novel solution for presenting multimedia content such as information, entertainment, a greeting, or the like to the calling party while waiting for an answer during the call-setup procedure.

BACKGROUND

With the emergence of 3G mobile telephony, new packet-based communication technologies have been developed for communicating multimedia content. For example, GPRS (General Packet Radio Service) and WCDMA (Wideband Code Division Multiple Access) technologies support wireless multimedia telephony services involving packet-switched communication of data representing images, text, documents, animations, audio files, video files, etc., in addition to traditional circuit-switched voice calls. The term "multimedia content" will be used in this description to represent any predefined data communicated by means of packet-switched transport.

Mobile networks will be designed to handle multimedia sessions that are divided into a circuit-switched (CS) part for voice transport and a packet-switched (PS) part based on IP technology for the transport of other data (typically multimedia content). In this way, the high performance associated with the traditional full duplex channels is obtained for voice, whereas any other data involved in multimedia services can be adequately supported by packet-switched transport, since it is normally not equally delay-sensitive. This arrangement can also reduce the costs for network operators by utilising existing resources for circuit-switched transmission, as e.g. in GPRS networks.

This solution is schematically illustrated in FIG. 1, where two exemplary mobile terminals A and B are engaged in a multimedia session involving both voice and multimedia content. Terminal A is connected to an access network 100A and terminal B is connected to another access network 100B, by means of conventional radio interfaces. Typically, each access network 100A, 100B has separate architectures and logic systems for circuit-switched transport and packet-switched transport, respectively, as indicated in the figure by a dashed line dividing the networks into a CS domain and a PS domain.

Voice is thus communicated in a separate circuit-switched call session 102, whereas multimedia content is communicated in a separate packet-switched multimedia session 104. In each session 102 and 104, various other intermediate networks and links may of course be involved, although not shown here for simplicity. The sessions 102 and 104 are basically independent of each other in terms of call management and transport channels, and each session may be started and terminated regardless of the other one. Typically, a CS-based voice call is established first, and then at some point during the call, multimedia may be introduced to the conversation by establishing a PS-based session. Simultaneous CS and PS sessions will become possible for access based on, e.g., WCDMA or GSM with DTM (Dual Transfer Mode) capability.

Recently, a network architecture called "IP Multimedia Subsystem" (IMS) has been developed by the $3^{rd}$ Generation Partnership Project (3GPP) as an open standard, to provide multimedia services in the packet domain. IMS is a general platform for enabling services based on IP transport, more or less independent of the access technology used, and is basically not restricted to any limited set of specific services.

A specification for session setup has been defined called "SIP" (Session Initiation Protocol, according to the standard IETF RFC 3261 et al), which is an application-layer control (signalling) protocol for creating, modifying and terminating sessions over a packet-switched logic. SIP is generally used by IMS service networks for establishing multimedia sessions, such as session 104. In the case of FIG. 1, an IMS network may be integrated into the PS part of each network 100A, 100B.

Since many different types of terminals are now available on the consumer market, two terminals about to communicate multimedia may have different capabilities, and each terminal has initially no knowledge of the capabilities of the other. In order to establish a multimedia session, session parameters must therefore first be selected and determined in a session setup procedure, by exchanging information regarding their specific capabilities and preferences. In SIP, a method called "INVITE" is defined to initiate a session during a call setup when the terminals exchange their capabilities.

During a traditional circuit-switched voice call-setup between a calling party A and a called party B, a simple ring-back tone is emitted at the calling terminal to indicate that a ringing signal has been activated at the called terminal. Although B can pre-select any type of ringing signal at the called terminal, such as a piece of music, vibration or any recorded sound, the ring-back tone given at the calling terminal normally consists of a single repeated tone which can be somewhat tiresome to hear if the called person's answer is delayed.

Today, a popular service for circuit-switched telephone calls called "music ring back tone" is often used to entertain the calling party while he/she is waiting for an answer from the called party. This service is often used by telephone exchanges at authorities and enterprises where the answer can be greatly delayed, e.g. when placed in a telephone queue. A pre-recorded piece of music or information is then played for the calling party until the called party answers.

FIG. 2a illustrates a signalling diagram for a conventional circuit-switched call-setup between a calling terminal A connected to an access network 1, and a called terminal B connected to another access network 2. The following steps are then basically executed:

200: As a user of terminal A enters the telephone number of terminal B, terminal A sends a call-setup message including the called B number to Network 1.

202: Network 1 identifies Network 2 based on the received B-number and sends a call-setup message including the A-number to Network 2.

204: Network 2 sends a call-setup message to terminal B. If a calling number presentation service is applied, this call-setup message also includes the A-number. Terminal B then starts to ring or vibrate to alert its user. Also, a circuit-switched channel between terminals A and B is now being reserved for the call.

206: Terminal B responds by sending an alerting message to Network 2, indicating that a ringing signal has been activated at the called terminal B.

208: Network 2 then sends an alerting message to Network 1.

210: At the same time, while waiting for the user to answer, network 2 also generates a ring-back "sound" over the reserved channel, i.e. "in-band". The ring-back sound is typically a simple repeated tone, but may also be any pre-recorded piece of audio, such as music or a spoken message, that has been preselected by the subscriber of terminal B.

212: The alerting message now reaches the calling terminal A indicating that terminal B emits the ringing signal. In response thereto, terminal A connects to the reserved channel to listen to the ring-back sound "in-band".

214: After a while, the user of terminal B answers the call.

216: Terminal B sends a connect message to Network 2, indicating that the user of terminal B has answered the call, and network 2 therefore stops generating the ring-back sound.

218: The connect message is sent from Network 2 to Network 1.

220: The connect message is sent from Network 1 to the calling terminal A.

222: The call-setup is now completed and the actual call session may begin.

According to the above-described conventional call-setup procedure, a ring-back sound or audio piece is always transferred "in-band" to the calling terminal A by means of a connection in the CS domain, i.e. the CS channel that has been reserved for the call being setup. This is basically illustrated in FIG. 2b where a dashed block 222 represents a conventional call-setup procedure in the CS domain between terminal A and terminal B, being connected to CS-based networks 1 and 2, respectively. The dashed arrow 224 within block 222 represents a ring-back audio piece being transmitted to terminal A during the call-setup 222 by means of a CS channel reserved for the call being setup. Hence, the ring-back mechanism is wholly integrated as a part of the CS-based call-setup procedure 222.

However, conventional call-setup procedures provide a limitation since the CS nature of the connection enables users to only present pre-recorded pieces of audio, such as music or voice, to waiting callers. In the present environment of mobile multimedia communication, it would be desirable to extend the current limited range of audio-based ring-back presentations by introducing other types of media as well, in particular visual media.

Moreover, a calling user may want to finish listening to a presented piece of audio, especially if some important information is presented. In conventional call-setup procedures, any ring-back audio sequence being played is automatically interrupted at the moment the called party answers, i.e. picks up the phone, irrespective of how much of the sequence has been played. Thus, it would also be desirable to enable a caller to continue listening to a ring-back audio sequence even if the called party has answered. On the other hand, a caller may find a played audio piece disturbing and may want to stop listening to it even before the called party answers, which is only possible today by taking the phone away from the ear. When doing so, the caller will naturally neither be able to hear whether the called party answers, making this an impractical solution.

SUMMARY

It is an object of the present invention to generally address at least some of the problems outlined above. More specifically, it is an object of the present invention to enable a solution to the problem of terminal users being limited to only present pre-recorded sounds, such as music or voice messages, to waiting callers. It is another object of the present invention to enable terminal users to control the play-out of ring-back presentations, regardless of when the call is actually answered.

These objects and others can be obtained by a method and arrangement for providing a ring-back presentation to a calling terminal after receiving a call setup request from the calling terminal for a first communication session with a called terminal, according to the attached independent claims.

The present method includes establishing a second packet-based communication session with the calling terminal, independent of the first session, and providing pre-defined media content representing said ring-back presentation to the calling terminal, by means of the second session. Thereby, it is possible to provide any type of media as a ring-back presentation, including visual media.

The pre-defined media content may have been stored in the called terminal, and in that case is sent therefrom to the calling terminal during the second session. The media content may be provided to the calling terminal as at least one file transferred from the called terminal during the second session, or, as a text string embedded in a session initiating message from the called terminal for the second session.

Alternatively, the pre-defined media content may have been stored in a server, and in that case is retrieved therefrom for delivery to the calling terminal by means of the second session. The server may be an RTSP server such that the media content is downloaded directly therefrom to the calling terminal. In that case, the network address of the RTSP server and a suitable reference to the media content is sent to the calling terminal in a session initiating message from the called terminal for the second session, to enable the downloading.

The server may also be a media server, and in that case an agent fetches the media content from the media server and delivers it to the calling terminal during the second session. Firstly, the called terminal preferably sends a session initiating message towards the calling terminal for the second session, and then the agent modifies the session initiating message to indicate itself as the sender before sending it to the calling terminal. When receiving an acknowledgment message from the calling terminal in response to the modified session initiating message, the agent may modify the acknowledgment message from terminal A to indicate that the session invitation is rejected and also to indicate itself as the sender of the message, and then sends the modified reject message to the called terminal.

The server may also be a network server that sends a session initiating message towards the calling terminal for said second session, in response to being notified that the first communication session is being setup. The media content is then preferably provided to the calling terminal as at least one file transferred from the network server during the second session. Alternatively, the media content may be provided to the calling terminal as a text string embedded in the session initiating message.

Typically, the pre-defined media content includes at least visual media.

An audio or vibration indication may be activated at the calling terminal to inform its user that said ring-back presentation is being received. In that case, the indication is preferably activated when determining that incoming signalling to terminal A over a parallel packet-switched bearer of the second session relates to the first session currently being established, or may be activated simply in response to receiving the session initiating message. A visual or vibration indication may also be activated at the calling terminal to inform its user that the call has been answered, which would be helpful when the user has removed his/her terminal from the ear.

When using the present invention, different ring-back presentations may have been defined for different potential callers, and/or depending on the current date or time of the day, week or season, and/or depending on a user status. Preferably, standardised SIP messages are used for handling the second communication session.

The present arrangement includes means for establishing a second packet-based communication session with the calling terminal, independent of the first session, and means for providing pre-defined media content representing said ring-back presentation to the calling terminal, by means of said second session.

In one embodiment, the called terminal is adapted to store the pre-defined media content and to sent it to the calling terminal during the second session. The called terminal may be further adapted to provide the media content to the calling terminal by transferring at least one file during the second session. Alternatively, the called terminal may be adapted to provide the media content to the calling terminal as a text string embedded in a session initiating message for the second session.

In another embodiment, the inventive arrangement includes a server in which the pre-defined media content has been stored, the server being adapted to deliver the media content to the calling terminal by means of the second session.

The server may be an RTSP server, such that the media content can be downloaded directly therefrom to the calling terminal. In that case, the called terminal may be adapted to send the network address of the RTSP server and a suitable reference to said media content to the calling terminal in a session initiating message for the second session, to enable the downloading.

The server may also be a media server, and the inventive arrangement may further include an agent adapted to fetch the media content from the media server and to deliver it to the calling terminal during the second session. In that case, the called terminal may be adapted to send a session initiating message towards the calling terminal for the second session, and the agent may be adapted to modify the session initiating message to indicate itself as the sender before sending it to the calling terminal. Furthermore, when receiving an acknowledgment message from the calling terminal in response to the modified session initiating message, the agent may be adapted to modify the acknowledgment message from terminal A to indicate that the session invitation is rejected and also to indicate itself as the sender of the message, and further adapted to send the modified reject message to the called terminal.

In another embodiment, the server is a network server adapted to send a session initiating message towards the calling terminal for the second session, in response to being notified that the first communication session is being setup. In that case, the network server may be further adapted to provide the media content to the calling terminal by transferring at least one file during the second session. The network server may also be adapted to provide the media content to the calling terminal as a text string embedded in the session initiating message.

The calling terminal is preferably adapted to activate an audio or vibration indication to inform its user that the ring-back presentation is being received. In that case, the calling terminal may be further adapted to activate said indication by determining that incoming signalling to terminal A over a parallel packet-switched bearer of the second session relates to the first session currently being established, or to activate the indication simply in response to receiving the session initiating message. The calling terminal may also be adapted to activate a visual or vibration indication to inform its user that the call has been answered.

The inventive arrangement may also include means for defining different ring-back presentations for different potential callers and/or depending on the current date or time of the day, week or season, and/or depending on a user status.

Further features of the present invention and its benefits will be explained in the detailed description below.

BRIEF DESCRIPTION OF THE DRAWINGS

The present invention will now be described in more detail by means of preferred embodiments and with reference to the accompanying drawings, in which:

FIG. 5a is a basic view of a circuit-switched call-setup procedure involving a ring-back feature, according to a second embodiment.

FIG. 5b is a signalling diagram illustrating a call-setup procedure involving a ring-back feature, according to the second embodiment.

DETAILED DESCRIPTION

Figure 1:
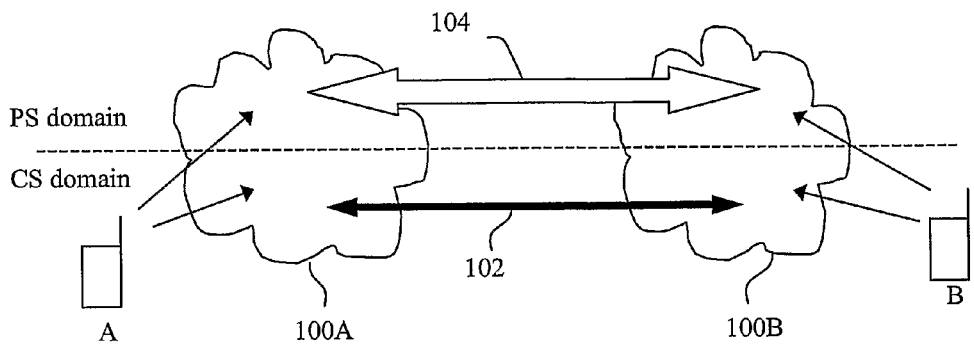
FIG. 1 is a schematic view of a communication session involving multimedia, according to conventional practice.

A basic solution according to one aspect will first be briefly described with reference to a communication scenario shown in FIG. 3a where a calling terminal A is connected to a first network 1 and a called terminal B is connected to a second network 2. As explained for FIG. 1, mobile networks will typically be separated into a CS part and a PS part. Therefore, network 1 in FIG. 3a includes both a CS-based network 300 and a PS-based network 302, the latter being typically an IMS network. Likewise, network 2 includes a CS-based network 304 and a PS-based network 306.

Figure 2A:
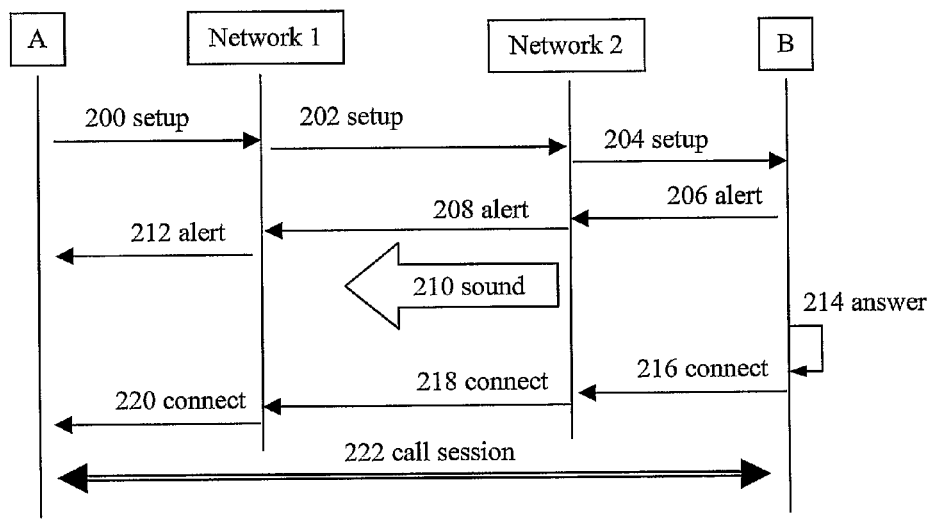
FIG. 2a is a signalling diagram illustrating a traditional call-setup procedure.
Figure 2B:
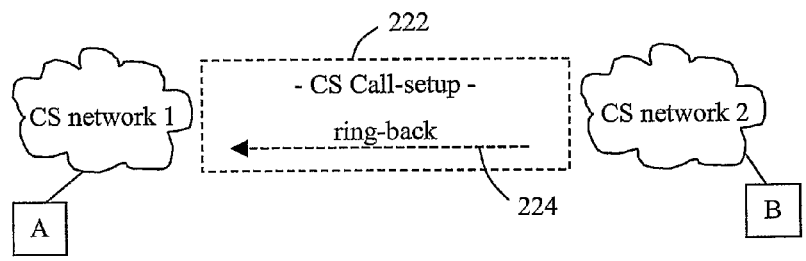
FIG. 2b is a basic view of a circuit-switched call-setup procedure involving a ring-back feature, according to the prior art.

In the conventional CS-based call-setup of FIG. 2b, a ring-back audio piece can be transmitted to the calling party by means of CS channels reserved for the forthcoming call, thus being wholly integrated in the call-setup procedure. However, the solution illustrated in FIG. 3a employs a separate PS session, preferably using the IMS platform, for conveying a ring-back presentation to the calling terminal A. In this description, the term "ring-back presentation" is used to represent any type of pre-defined media content being provided to a caller, e.g. carrying information, entertainment, a greeting, etc., in any media format that can be communicated by means of a PS session with the caller.

According to the present aspect, a conventional call-setup procedure for a first communication session is conducted as illustrated by a dashed block 308, and a completely separate packet-switched second session is further established, as illustrated by a dashed block 310, during the ongoing call-setup 308. A ring-back presentation 312 is provided to the calling terminal A by means of the PS session 310, independently of the call-setup 308. At the same time, the ring-back function may optionally still be provided, e.g. as a ring-back tone "in the background", according to conventional procedures within the call setup 308, as illustrated by dashed arrow 314.

Different mechanisms can be used for providing the actual media content of the ring-back presentation 312 to terminal A, which will be described in more detail later below with reference to different embodiments. Thus, using a separate PS session enables provision of a wide range of different media types as a ring-back presentation while waiting for an answer, such as video clips, images, text, documents, animations, audio clips, and any combination thereof.

Since the PS session 310 is not affected by the call-setup 308, the caller receiving the ring-back presentation may be free to decide whether to play or display the ring-back presentation and when to stop playing it as well, regardless of when the call is actually answered (although it may be convenient just to have the presentation started automatically). For example, an interesting video clip from the called party may be played on the caller's terminal while waiting for an answer, and when the called party has answered, the video clip can be discussed while still being played. If an image constitutes the ring-back presentation, it may remain displayed during the call.

On the other hand, the caller would also be free to refrain from playing the ring-back presentation, e.g. a tiresome piece of music or video clip, even though it has actually been provided to the terminal. Moreover, this solution allows for selective ring-back presentation based on the calling number, such that certain pre-selected callers would receive a specific ring-back presentation, whereas others would not. Groups of specific potential callers may also be defined to receive different ring-back presentations, and so forth. It is also possible to define different ring-back presentations depending on various time factors, such as the current date or time of the day, week or season, etc. Still further, a succession of different ring-back presentations may be provided if the answer is increasingly delayed. Moreover, it is also possible for the user to define different ring-back presentations depending on a user status, such as "busy", and even "busy: meeting", "busy: at cinema", "busy: sleeping", etc.

Figure 3A:
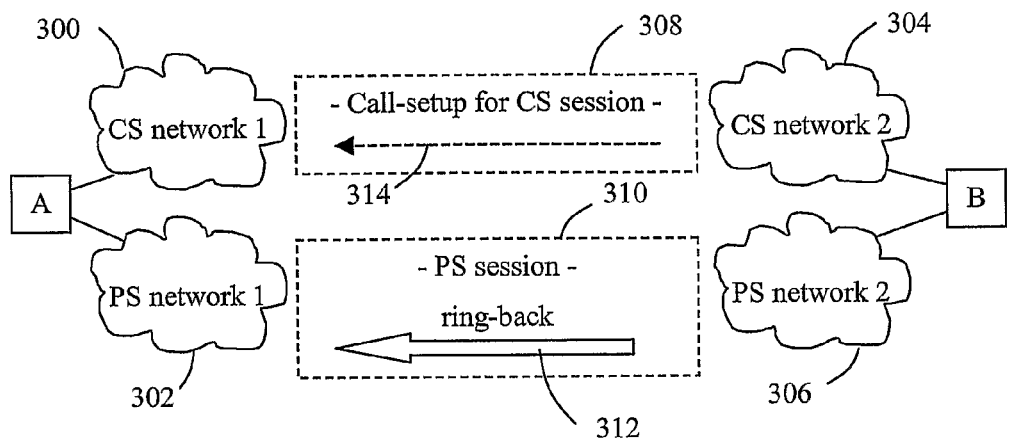
FIG. 3a is a basic view of a circuit-switched call-setup procedure involving a ring-back feature, according to one aspect.
Figure 3B:
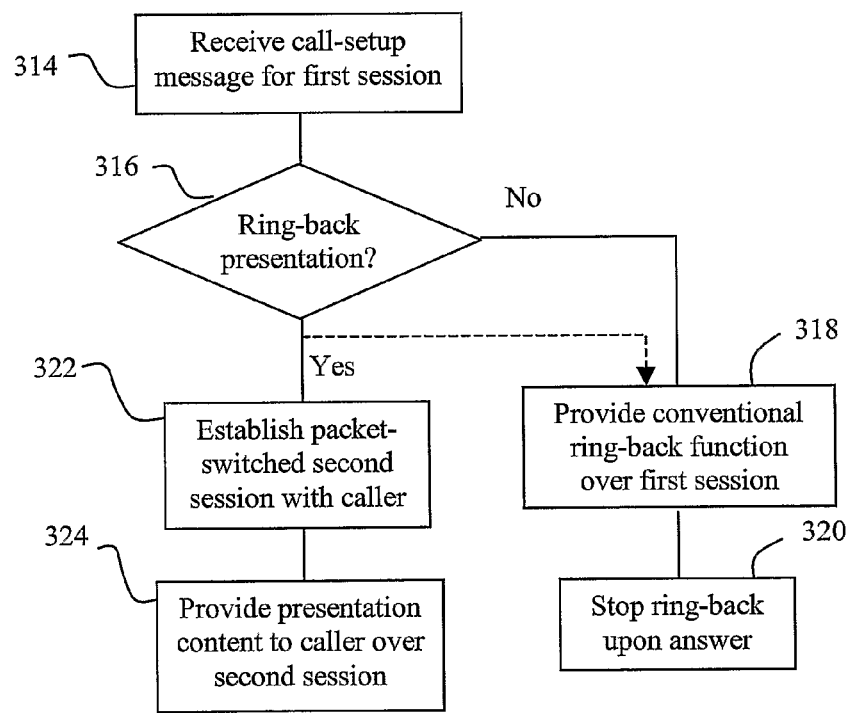
FIG. 3b is a flow chart illustrating a basic procedure for providing a ring-back feature during a call-setup procedure, according to another aspect.

FIG. 3b is a flow chart generally illustrating a method of providing a ring-back feature during a call-setup procedure in accordance with another aspect, e.g. corresponding to the situation shown in FIG. 3a. In a first step 314, a conventional call-setup message directed to a called terminal for a first communication session is received from a calling terminal. Typically, this message is intended to initiate a CS voice call as in FIG. 3a, but any type of call or session is possible in this context.

In a step 316, it is determined whether a pre-defined ring-back presentation is to be provided to the calling terminal in response to the call-setup message, e.g. based on pre-defined lists of potential callers as described above. If not, only the conventional ring-back function of the call-setup procedure is used in a step 318, to provide a conventional ring-back tone or a pre-recorded piece of audio, in the manner described for FIGS. 2a and 2b above. According to the conventional call-setup procedure, the ring-back function is halted in a step 320 as soon as the called party answers the call. It should be noted that alternative "No" leading to steps 318 and 320 lies outside the scope of the present invention.

However, if it is determined in step 316 that a ring-back presentation is to be provided, a packet-switched second communication session is established with the caller in a step 322. Thereafter, media content according to the pre-defined ring-back presentation is provided to the caller by means of the established second session, in a final step 324. It should be noted that in this case, the conventional ring-back function of the call-setup procedure may still be activated, as indicated by the dashed arrow, to provide e.g. a simple ring-back tone to the caller "in the background", at the same time the media content is provided over the second session by means of steps 322 and 324.

In the present solution, the first communication session may be either a CS session or a PS session. A requirement for this solution to work for a CS-based first communication session is that both terminals A and B must be connected to mobile access networks capable of providing a CS session and a PS session simultaneously. This is basically fulfilled by WCDMA access with multi radio bearer capabilities, and by GSM access with DTM (Dual Transfer Mode) capabilities. Thus, for voice calls, a circuit-switched voice bearer and a packet-switched data bearer are handled simultaneously. If the first communication session is a video call, a circuit-switched data bearer and a packet-switched data bearer are handled simultaneously.

When implementing this solution, different mechanisms can be employed for providing the media content to the caller according to the following embodiments. In the following figures, certain elements have the same numerals as corresponding elements in FIG. 3a, namely PS network 1 302, PS network 2 306, CS session 308 and PS session 310, and they will not be described again below. Moreover, standardised SIP messages are generally used for managing the packet-switched second communication in these examples, although the present invention is basically not limited thereto.

Figure 4A:
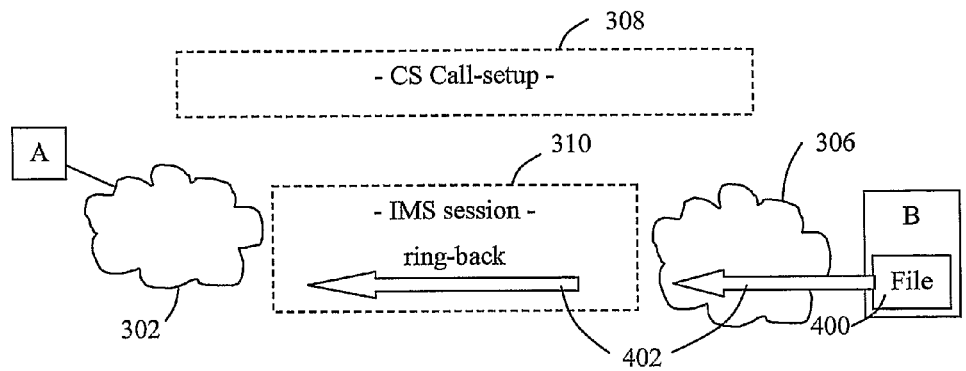
FIG. 4a is a basic view of a circuit-switched call-setup procedure involving a ring-back feature, according to a first embodiment.
Figure 4B:
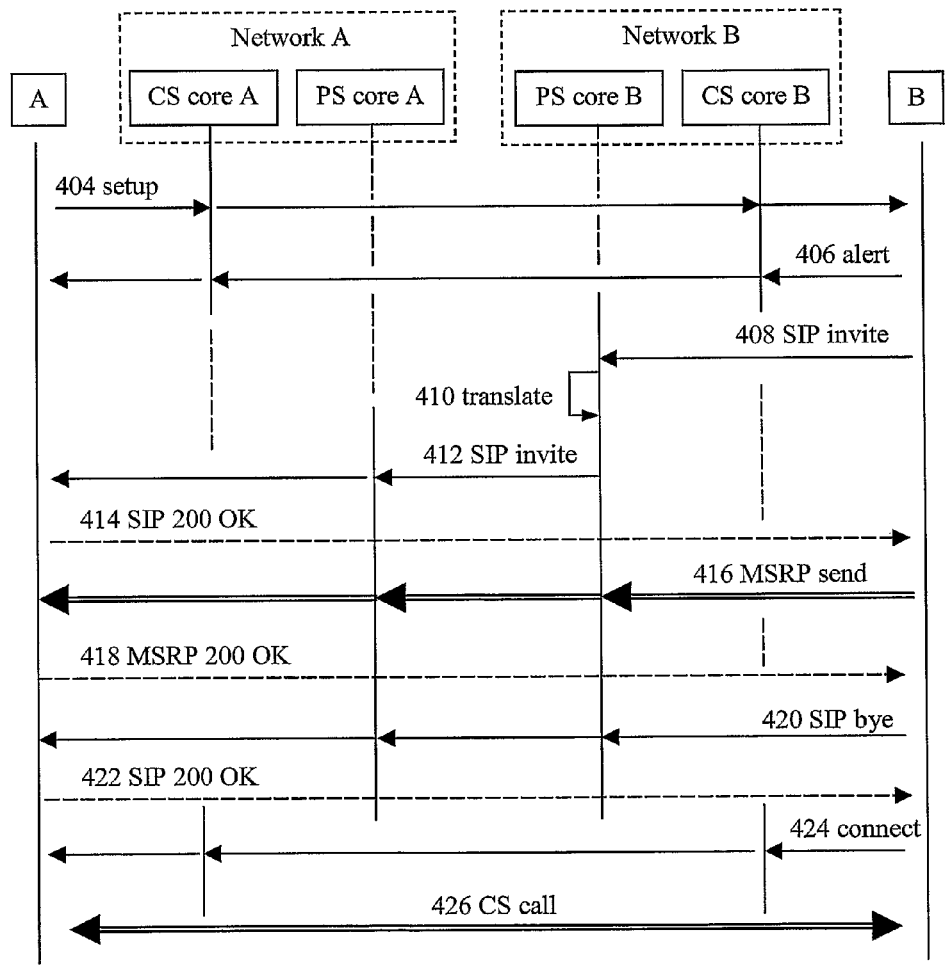
FIG. 4b is a signalling diagram illustrating a call-setup procedure involving a ring-back feature, according to the first embodiment.

FIGS. 4a and 4b illustrate a first embodiment where a "media content file" stored in a called terminal B is provided as a ring-back presentation to a calling terminal A. The media content file may be of any format or type, see the examples given above, and can be delivered if terminal A is capable of receiving and playing it. Thus, a CS call-setup procedure 308 is executed for a first communication session by means of CS networks to which A and B are connected to, although not shown here for simplicity. A simultaneous PS-based second communication session, in this case an IMS session 310, is also established over PS networks 302 and 306. A media content file 400 stored in terminal B, e.g. a video clip or an image, is provided directly from terminal B as the ring-back presentation, illustrated by arrows 402. It should be noted that more than one file can be provided from terminal B to make up the ring-back presentation, e.g. multiplexed in a suitable manner.

FIG. 4b is a signalling diagram illustrating the solution according to the first embodiment. In this example, an ordinary CS voice call is the first communication session. The calling terminal A is connected to a network A having CS and PS domains, here represented by a CS core A and a PS core A. The called terminal B is connected to a network B likewise including a CS core B and a PS core B. In this example, PS cores A and B are IMS networks using SIP as a signalling protocol, although the present invention is generally not limited in this respect.

In a first step 404, a CS-based conventional call-setup message, including the telephone number of A, is sent from terminal A over CS core A and CS core B to terminal B, corresponding to steps 200-204 in FIG. 2a. The number of A may be provided in the message by means of an existing function called "CLID (Calling Line Identity)". In a step 406, terminal B responds by sending an alerting message over CS core B and CS core A to terminal B, indicating that a ringing signal has been activated at the called terminal B. A conventional ring-back tone or the like may optionally also be provided "in-band" to terminal A, as described above. So far, the procedure is basically the same as steps 200-212 in FIG. 2a.

However, after determining that a certain separate ring-back presentation is to be provided, a packet-switched second communication session is established with terminal A according to this solution. Thus in a next step 408 of this embodiment, terminal B sends a SIP INVITE message directed to the telephone number of A, to initiate a PS-based session with terminal A. The SIP INVITE message typically includes information on the media to be transmitted, such as required codec(s) and file size. This message is first received by PS core B which makes a translation of the received telephone number of A into a valid SIP URL (Uniform Resource Locator), as indicated by a step 410, in order to have the message routed by packet-switching to A, since the telephone number is not valid for SIP routing.

This number translation can be made using conventional procedures, and a method called "ENUM" is typically used to derive an SIP URL from the received telephone number. PS core B would then translate the received number into a valid SIP URL by means of well-known IETF standards. In the case when terminal A is a mobile telephone having an exemplary MSISDN number 0709123456, PS core B may translate it into, e.g., 0709123456@op.com or in other cases generally name@op.com The SIP INVITE message can now be conveyed from PS core B to PS core A using the derived SIP URL of terminal A, and PS core A sends the session invitation to terminal A, altogether illustrated by a general step 412. The session invitation SIP INVITE basically indicates to terminal A that terminal B intends to send a separate ring-back presentation, e.g. a video clip or an image. The SIP INVITE message contains a field called "SDP (Session Data Protocol)" indicating the type of media to be sent.

When receiving this invitation, terminal A automatically determines whether it can cope with the required codec(s) and file size. Terminal A may further prompt its user e.g. by displaying a text message such as: "Receiving a video clip from 0709123456. Play now?", or "Receiving an image from 0709123456. Display now?", for manual consent by the user. Alternatively, terminal A may accept the ring-back presentation automatically, although automatic acceptance may prove to be the better solution in practice. The choice between manual and automatic acceptance of the ring-back presentation may be set as a preference in terminal A. In this example, the session invitation is somehow accepted, and the next step 414 illustrates that terminal A responds by sending an acknowledgment message "SIP 200OK" over PS cores A and B to terminal B to indicate acceptance thereof.

The media content of the ring-back presentation (e.g. video clip or image) can now be transmitted in a step 416 from terminal B to terminal A over PS cores B and A, contained in a message "MSRP SEND" (MSRP=Message Session Relay Protocol), thereby providing the ring-back presentation to A. This step corresponds to the stored file 400 being sent as the ring-back presentation 402 over the PS session 310 in FIG. 4a. In this context, the "file" 400 may generally represent any pre-defined media content in any number of actual files. For example, a video clip may contain an audio component as well, suitably multiplexed with the visual content for transmission. Terminal A is also preferably adapted to "multiplex" a conventional ring-back tone received over the first session with any audio content received over the second session, and play both for the user. It is also possible for the user to mute the audio component of a video clip such that only the ring-back tone is heard.

In any case, the user of terminal A can then enjoy the ring-back presentation while waiting for an answer from the user of terminal B. There may be some practical matters to solve on how to draw the A-user's attention to: 1) when the presentation is received, and 2) when the B-user has answered, and these will be addressed later in this description.

When receiving the media content, terminal A sends another acknowledgment message SIP 200OK over PS cores A and B to terminal B, in a step 418, to indicate proper reception of the content. After the file transfer has been completed, the second session is released by terminal B sending a "SIP BYE" message to terminal A over PS cores B and A, in a step 420. This is followed by another acknowledgment message SIP 200OK from terminal A to terminal B over PS cores A and B, in a step 422.

At any point during steps 408-422 or thereafter, the B-user may answer the call and terminal B will then send a connect message in a step 424, corresponding to steps 214-218 in FIG. 2a, which is conveyed over CS core B and CS core A to terminal A. The call, or first session, is then executed in a final step 426. However, it should be noted that execution of steps 424 and 426 relating to the first CS-based session do not necessarily affect the steps 408-422 relating to the second PS-based session. Thus, the ring-back presentation can be provided and played/displayed irrespective of when the B-user answers, and the A-user may control it independently. However, it is also possible to automatically interrupt the presentation at terminal A when the call is answered. This would require a suitable coordination logic between applications of the first session and playout/display of the presentation in terminal A, which is outside the scope of the present invention and is therefore not described here further. The choice between continued playout/display of the presentation and automatic interruption thereof may be set as a preference in terminal A.

The procedure of getting the media content to terminal A according to steps 408-422 can be executed quite rapidly, and normally before the B-user manage to answer, although a video and/or audio clip may be played at terminal A for a greater length of time. Preferably, a so-called "progressive download" can be used, meaning that playout at A starts as soon as the first packets arrive. The implementation of this function will depend on certain case-specific factors, such as the size of file 400 and playout buffer depth in terminal A. Anyway, it is a great advantage that this solution basically allows the A-user to continue seeing/hearing the presentation even after the B-user has answered, such as playing a video clip or looking at an image, or to interrupt the presentation before the B-user has answered. Playout of a video and/or audio clip may also be repeated automatically or manually.

FIGS. 5*a* and 5*b* illustrate a second embodiment where the media content is a pre-defined alphanumeric string stored in terminal B to be provided as a ring-back presentation to terminal A. A limited text string can be accommodated in a standard SIP message, which makes this embodiment somewhat simpler than the first one. In FIG. 5*a*, a text string 500 stored in terminal A is provided directly therefrom as the ring-back presentation 502.

FIG. 5*b* is a signalling diagram for the second embodiment of FIG. 5*a*. The first steps 504 and 506 of setting up an ordinary CS voice call between A and B, i.e. the first communication session, are the same as steps 404 and 406, respectively, in the first embodiment. In this example, after determining that a ring-back presentation is to be provided, a packet-switched second communication session is established with terminal A by terminal B sending a message called "SIP MESSAGE" directed to the telephone number of A, in a next step 508. Here, the presentation 502 can be provided immediately by simply embedding the text string 500 into this message. Thus, no initiating SIP INVITE is sent and no codec(s) or file size needs to be established and acknowledged first by terminal A.

Similar to step 410 above, the telephone number of terminal A in the SIP MESSAGE of step 508 is translated by PS core B into a valid SIP URL, in a step 510, and the message is sent from PS core B to terminal A over PS core A, in a following step 512. The SIP MESSAGE indicates to terminal A that terminal B intends to provide a ring-back presentation, in this case a text string. If the SIP MESSAGE was received properly, terminal A responds by sending an acknowledgment message SIP 200OK over PS cores A and B to terminal B, in a next step 514. When receiving this message, terminal A may again prompt its user e.g. by displaying a text message such as: "Receiving a text string from 0709123456. Read now?", for manual consent by the user. Alternatively, terminal A may display the received text string automatically.

If the B-user answers the call, terminal B will send a connect message to terminal A over CS core B and CS core A, in a step 516, and the call, or first session, can be executed in a final step 518, just like steps 424 and 426 above. When the call begins, the text string may remain displayed at terminal A, or be deleted either manually or automatically.

Figure 6A:
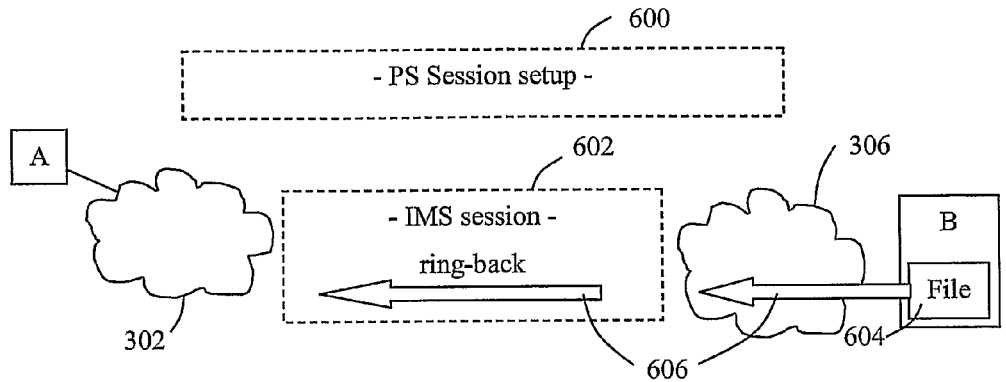
FIG. 6a is a basic view of a packet-switched call-setup procedure involving a ring-back feature, according to a third embodiment.
Figure 6B:
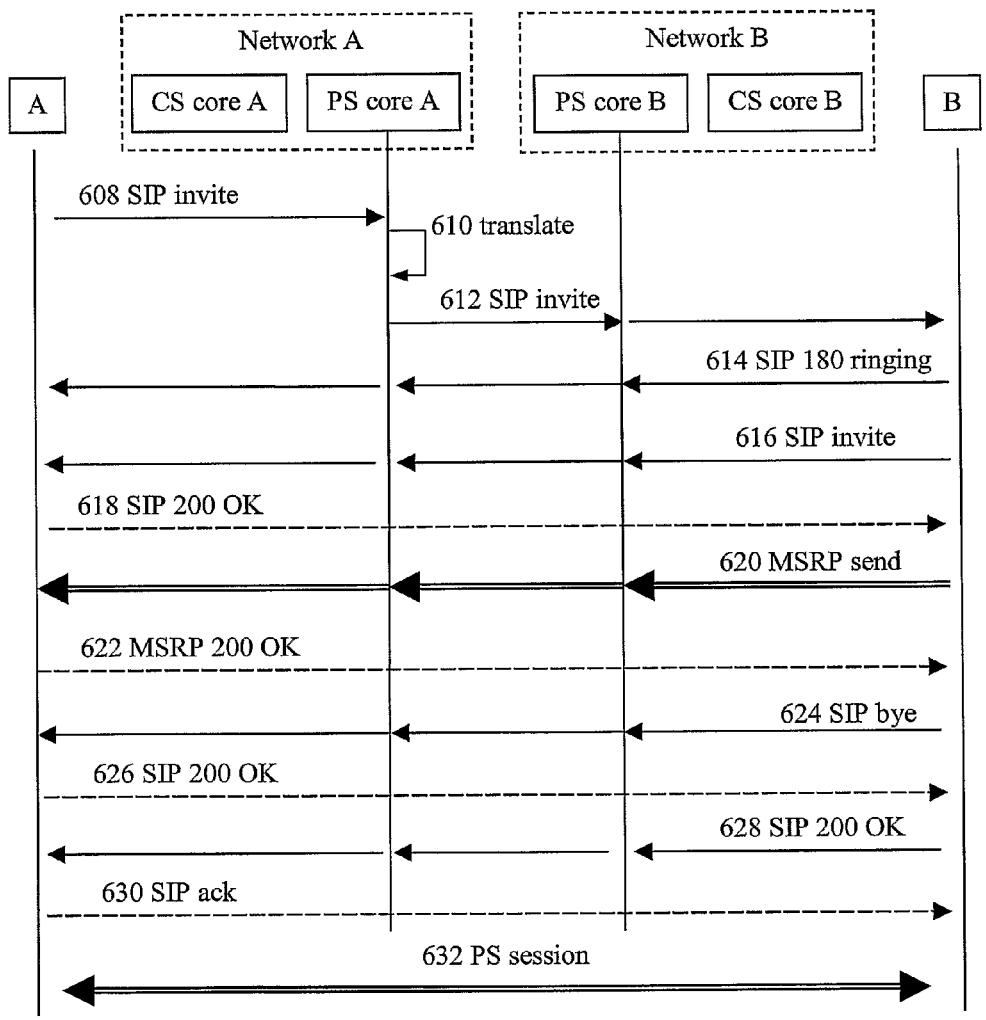
FIG. 6b is a signalling diagram illustrating a call-setup procedure involving a ring-back feature, according to the third embodiment.

FIGS. 6*a* and 6*b* illustrate a third embodiment where the first communication session is a packet-switched session, e.g. involving "voice over IP". Thus, in FIG. 6*a*, a setup procedure 600 for a packet-switched first session is executed, and a packet-switched second session 602 is established for the ring-back function. Like the first embodiment, the media content is a file 604 stored in terminal B to be provided directly therefrom as a ring-back presentation 606 to terminal A.

FIG. 6*b* is a signalling diagram illustrating the solution according to the third embodiment. In this example, a PS-based session for voice over IP is the first communication session. In a first step 608, the calling terminal A sends an SIP INVITE message directed to the telephone number of B, to initiate a PS session with terminal B. This message is first received by PS core A which makes a translation (according to ENUM) of the received telephone number of B into a valid SIP URL, in a step 610, in order to have the message routed by packet-switching to terminal B. The SIP INVITE message in step 608 includes a SIP URL of terminal A as a source address that is valid and can be used in the PS domain, i.e. by PS cores A and B.

The SIP INVITE message from terminal A can now be further conveyed from PS core A to terminal B over PS core B using the derived SIP URL of terminal B, in a step 612. The SIP INVITE message includes information on required codec(s) and other communication parameters needed for the forthcoming voice over IP session, and terminal A determines automatically whether it can accept the proposed terms. In a next step 614, terminal B responds by sending a standard message called "SIP 180 ringing" to terminal A over PS cores B and A, indicating that a ringing signal has been activated at terminal B.

So far, the setup procedure for the PS-based first session has been conducted according to standard routines. However, after determining that a ring-back presentation is to be provided, a packet-switched second communication session is established with terminal A for providing the file 604 to terminal A, which can be done basically as in the first embodiment. Thus in a next step 616, terminal B sends a SIP INVITE message directed to the SIP URL of terminal A, to initiate the second session with terminal A. In this case, however, no ENUM translation is needed since the SIP URL is already available from the source address given in the SIP INVITE message of step 608.

Like the previous embodiments, when receiving the invitation indicating the imminent ring-back presentation, terminal A may prompt its user for manual consent to receive and play/display it, or accept the ring-back presentation automatically. Terminal A now responds by sending an acknowledgment message "SIP 200OK" over PS cores A and B to terminal B to indicate acceptance of the session invitation, in a next step 618.

The media content of the ring-back presentation, i.e. the file 604, can now be transmitted in a step 620 by means of the second session 602 from terminal B to terminal A over PS cores B and A, in a message "MSRP SEND", thereby providing the ring-back presentation to terminal A. When receiving the media content, terminal A sends another acknowledgment message SIP 200OK over PS cores A and B to terminal B, in a step 622, to indicate proper reception of the content. After the file transfer has been completed, the second session is released by terminal B sending a "SIP BYE" message to terminal A over PS cores B and A, in a step 624. This is followed by another acknowledgment message SIP 200OK from terminal A to terminal B over PS cores A and B, in a step 626.

At any point during steps 616-626, the B-user may answer the initial voice over IP call and terminal B will then send an SIP 200OK message, as indicated in a step 628, which is conveyed over CS core B and CS core A to terminal A. The voice over IP call, or first session, is then executed in a final step 632, although not affecting the ring-back presentation function which can be enjoyed or not preferably by choice of the A-user. It should be noted that the first session may be a packet switched session in all the other embodiments as well.

Figure 7A:
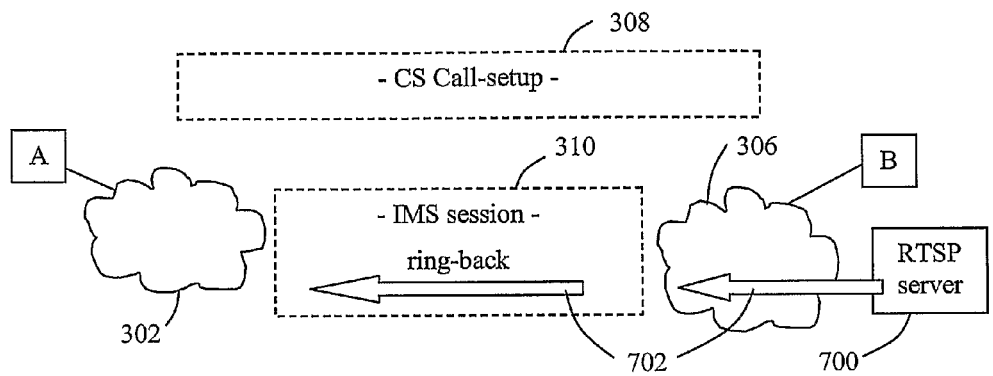
FIG. 7a is a basic view of a circuit-switched call-setup procedure involving a ring-back feature, according to a fourth embodiment.
Figure 7B:
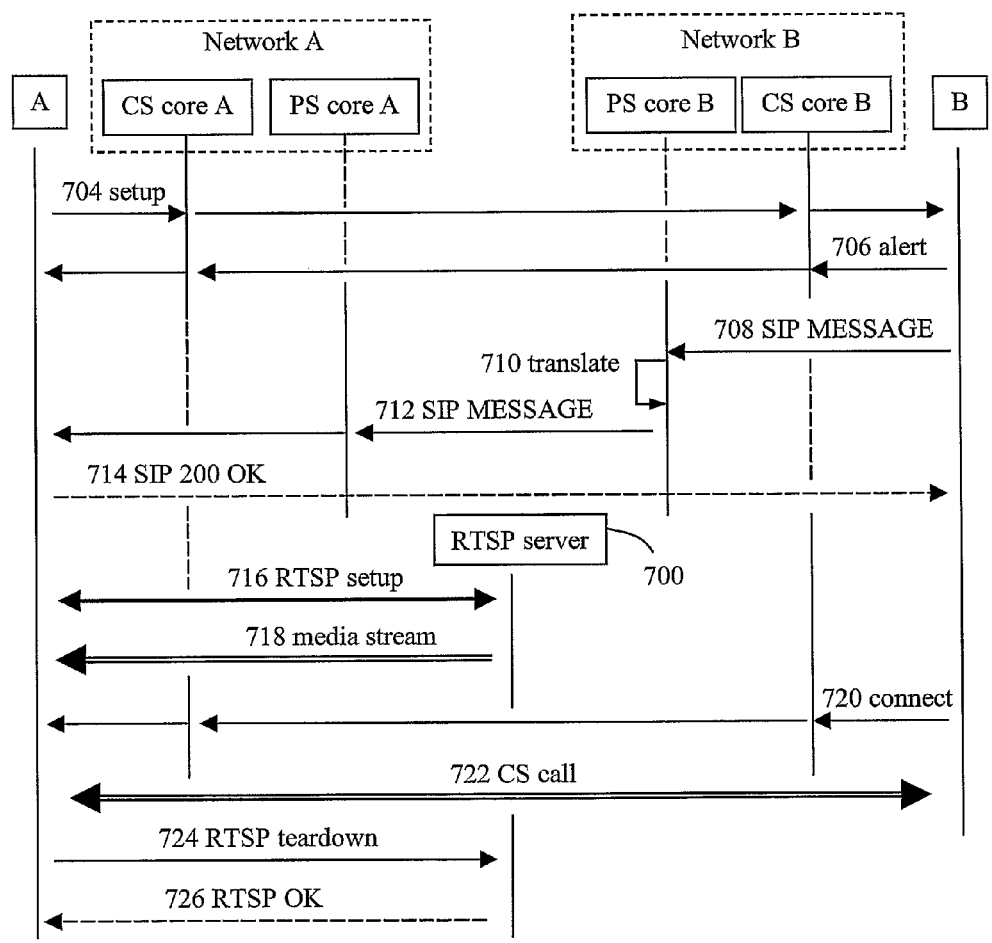
FIG. 7b is a signalling diagram illustrating a call-setup procedure involving a ring-back feature, according to the fourth embodiment.

The embodiments described above provide for "terminal-to-terminal" media delivery. FIGS. 7*a* and 7*b* illustrate a fourth embodiment where the media content to be provided as a ring-back presentation to terminal A, is stored in an RTSP (Real Time Streaming Protocol) server 700 which can be accessed by terminal A for fetching the media content therefrom. When calling terminal B, terminal A is instructed to contact the RTSP server 700 for receiving the presentation as a media stream 702 therefrom. This embodiment thereby provides for "server-to-terminal" media delivery. The RTSP server may basically be located anywhere, although preferably in network B.

Thus, in this embodiment, terminal B is relieved from storing ring-back related media and sending a ring-back presentation each time a call is received which will save storage space and precious radio bandwidth. Since a server has generally greater storing capacity than a mobile terminal, more elaborate ring-back presentations can be provided to callers. A user of terminal B can also predefine a greater number of different presentations for different callers without consuming storage space in terminal B.

FIG. 7b is a signalling diagram according to the fourth embodiment. The first steps 704 and 706 of setting up an ordinary CS voice call between A and B, i.e. the first communication session, are the same as steps 404 and 406, respectively, in the first embodiment. In this example, after determining that a ring-back presentation is to be provided, a packet-switched second communication session is established with terminal A by terminal B sending an "SIP MESSAGE" directed to the telephone number of A, in a next step 708. The SIP MESSAGE now contains the network address of the RTSP server 700 and a suitable reference to the media content being stored therein that constitutes the intended ring-back presentation. For example, in the present SIP protocol, the existing SIP MESSAGE is a suitable message to use for this end.

Similar to step 410 in the first embodiment, the telephone number of terminal A, which was given in the setup message of step 704, is translated by PS core B into a valid SIP URL, in a step 710, and the SIP MESSAGE is sent from PS core B to terminal A over PS core A, in a following step 712. This SIP MESSAGE effectively informs terminal A that a ring-back presentation is available in RTP server 700, which may be any type of media, e.g. video, audio, image, text, etc. Then, terminal A responds by sending an acknowledgment message SIP 200OK over PS cores A and B to terminal B, in a next step 714. Receiving the SIP MESSAGE, terminal A may prompt its user e.g. by displaying a text message such as: "A video clip available at mml.op.com/0709123456_video_1. Fetch now?", for manual consent by the user. Alternatively, terminal A may fetch the clip from RTSP server 700 automatically.

If accepted, terminal A now initiates downloading of the indicated media content from RTSP server 700, by executing a conventional session setup routine illustrated by a generic step 716. This routine includes various messages back and forth, not shown, and typically a message "RTSP SETUP" from terminal A to RTSP server, a response message "RTSP OK" from RTSP server, a message "RTSP PLAY" from terminal A to RTSP server, and another response message "RTSP OK" from RTSP server. When the setup is completed, the media stream can be downloaded from RTSP server to terminal A, in a step 718, and the presentation may be played out at the same time.

If the B-user at some point answers the call, terminal B will send a connect message to terminal A over CS core B and CS core A, in a step 720, and the call, or first session, can be executed in a step 722, just like steps 424 and 426 in embodiment 1. When the call begins, the media stream to terminal A may still continue, and the call does preferably not affect the ongoing downloading procedure. When the media stream has been completed, a message "RSTP TEARDOWN" is sent from terminal A to the RSTP server in a step 424, which is acknowledged by a response "RSTP OK" in a final step 726. It should be noted that steps 724 and 726 may instead be executed before steps 720 and 722, if the media stream is completed before the call is answered.

Figure 8A:
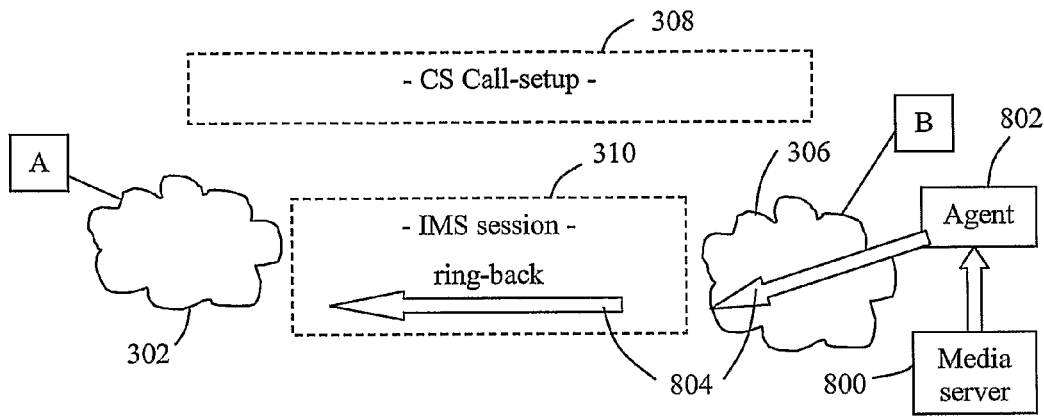
FIG. 8a is a basic view of a circuit-switched call-setup procedure involving a ring-back feature, according to a fifth embodiment.
Figure 8B:
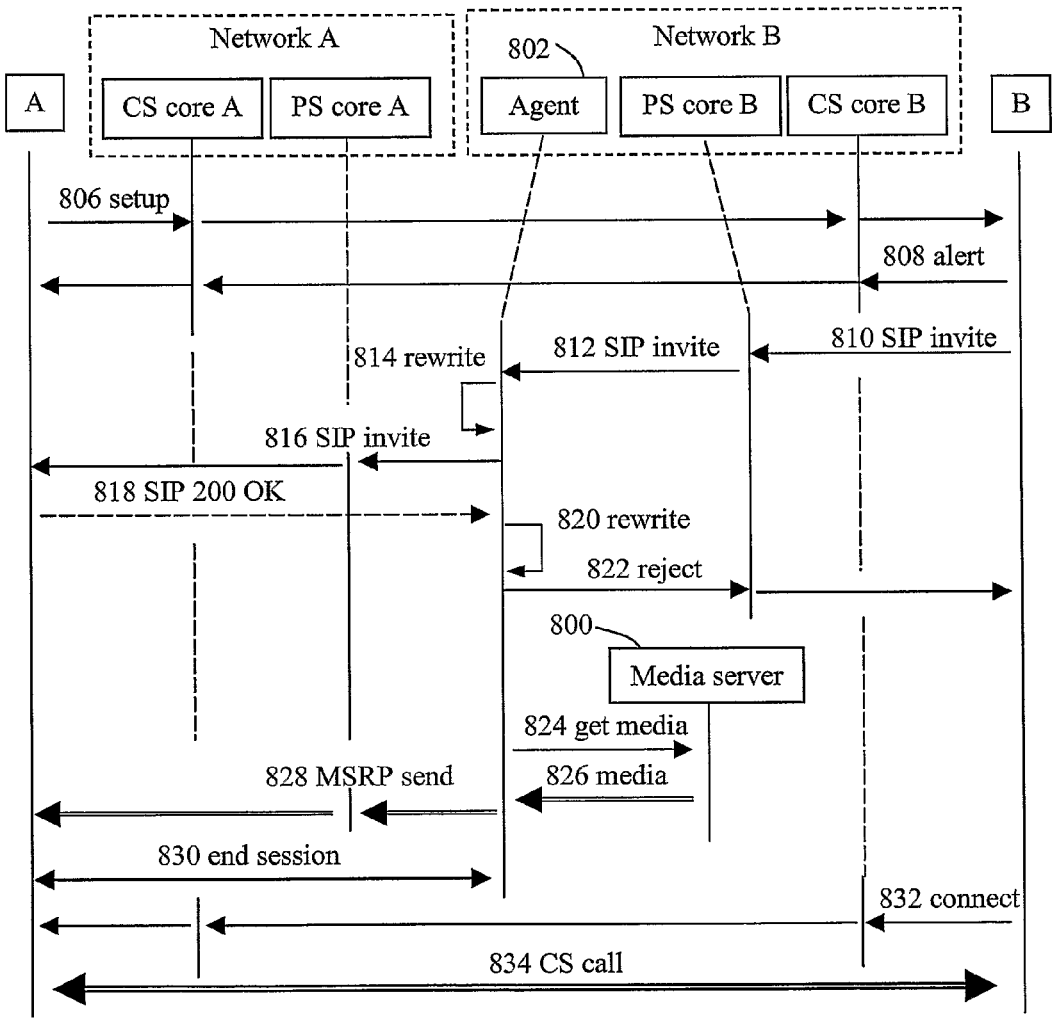
FIG. 8b is a signalling diagram illustrating a call-setup procedure involving a ring-back feature, according to the fifth embodiment.

FIGS. 8a and 8b illustrate a fifth embodiment where the media content to be provided as a ring-back presentation to terminal A, is stored in a media server 800, just as in the fourth embodiment. However, an "agent" 802 is used such that when terminal B is called, the agent 802 fetches the relevant media content from media server 800 and then provides it as a ring-back presentation 804 to terminal A. Both terminals A and B will then perceive the ring-back presentation as a terminal-to-terminal media delivery, even if server-to-terminal media delivery is actually provided. Thus, technically, terminal A will see the agent 802 as the called terminal and terminal B will see agent 802 as the calling terminal. The agent 802 is a node adapted to basically emulate a terminal, and it may be located in network B whereas the media server may be located anywhere, although preferably also in network B.

Also in this embodiment, terminal B is relieved from sending a ring-back presentation when receiving a call. Using an agent according to this arrangement has been devised mainly to avoid certain potential "legacy" problems when network B has been upgraded to employ server-to-terminal media delivery to improve the performance, while network A still employs terminal-to-terminal media delivery. Therefore, terminals in network A will not be able to act according to the server-to-terminal method, but this can be solved by "emulating" a terminal-to-terminal method as in this embodiment.

FIG. 8b is a signalling diagram according to the fifth embodiment. The first steps 806 and 808 of setting up an ordinary CS voice call between A and B, i.e. the first communication session, are again the same as steps 404 and 406, respectively, in the first embodiment. After determining that a ring-back presentation is to be provided, terminal B sends an SIP INVITE message directed to the telephone number of A, which is received by PS core B, in a next step 810.

However, in this embodiment, PS core B does not convey this session invitation towards terminal A, but sends it to the agent 802 instead, in a step 812. The agent then modifies the message to indicate itself as the sender, as illustrated by a "rewrite" step 814, before conveying it to terminal A over PS core A, in a next step 816, in order to establish a packet-switched second communication session with terminal A. Terminal A then responds by sending an acknowledgment message SIP 200OK over PS core A back to the agent, in a step 818. As in the previous embodiments, terminal A may first prompt its user for manual consent by the user to the ring-back presentation, or may accept it automatically.

The agent now modifies the acknowledgment message from terminal A to indicate that the session invitation is actually rejected, and also to indicate itself as the sender, as illustrated by a "rewrite" step 820. The created reject message is then sent to terminal B over PS core B, in a next step 822. The reject message in step 822 may be a modified SIP 200OK message, or this may be replaced by any other appropriate reject code.

When receiving the reject message, terminal B will not send any media content as a ring-back presentation to terminal A. On the other hand, the agent 802 now retrieves the network address of the media server 800 and a reference to the media content stored therein that constitutes the intended ring-back presentation. The agent can obtain the reference to the media content in alternative ways. It may be retrieved from subscriber data stored in PS core B or from the end-user by means of a so-called "self-service gateway", or it may be calculated by means of an algorithm based on identities of A and B, or it may be given in the SIP INVITE message of step 810.

Next, the agent sends a request for the media content to the media server 800, in a step 824, and receives it in a following step 826. Thereafter, the agent provides the media content to terminal A over PS core A, in a MSRP send message, as illustrated by a step 828, and the ring-back presentation can now be played and/or displayed at terminal A. When the media content delivery has been completed in step 828, a routine procedure is executed to end the second session, as generally illustrated by a step 830. This session ending procedure corresponds to steps 418-422 in the described first embodiment of FIG. 4*b*.

Finally, when the B-user at some point answers the call initiated by steps 806 and 808, terminal B will send a connect message to terminal A over CS core B and CS core A, in a step 832, and the call, or first session, can be executed in a step 834, just like steps 424 and 426 in embodiment 1. The above-described fifth embodiment allows for early deployment of the server-to-terminal method of providing the ring-back function, since it does not impact the networks A and B significantly.

The above-described embodiments 1-5 basically require that the called terminal somehow initiates the procedure of providing a ring-back presentation to the calling terminal, either for sending the actual media content itself or for making a server or agent send the content. For example, when SIP is used in these embodiments, terminal B is obliged to send either a SIP INVITE or a SIP MESSAGE towards terminal A as described above.

A sixth embodiment will now be described with reference to FIG'S 9*a* and 9*b* where the called terminal is even relieved from taking any action whatsoever, upon an incoming call, for initiating the provision of a ring-back presentation. The media content to be provided as a ring-back presentation to terminal A is stored in a network server 900. Like in the embodiments shown in FIG'S 7*a,b* and 8*a,b*, the sixth embodiment thereby provides for "server-to-terminal" media delivery 902 relieving terminal B from storing and sending ring-back related media, which provides benefits as described above. The server 900 may basically be located anywhere, and in this case it is located in network B.

In all embodiments involving server-to-terminal delivery, including this one, the user of terminal B must somehow configure the ring back presentation content (texts, images, video clips, etc.) in the network server 900 in advance, e.g. via a web portal, either differently for different callers or uniformly for all callers.

Figure 9A:
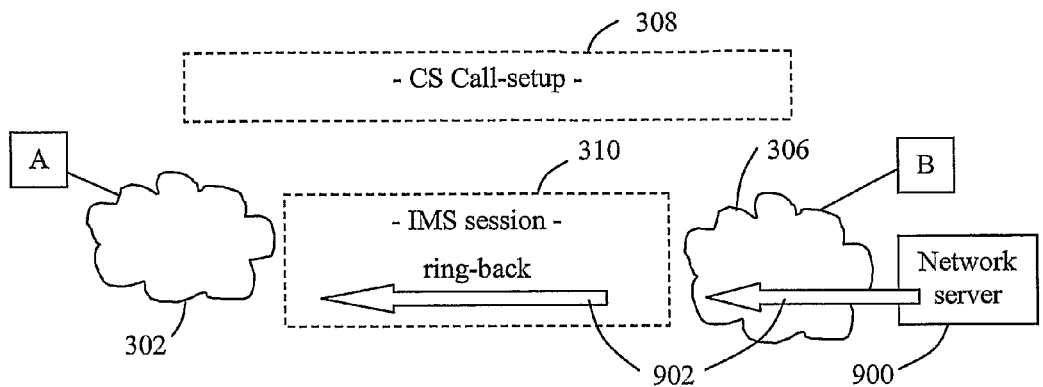
FIG. 9a is a basic view of a circuit-switched call-setup procedure involving a ring-back feature, according to a sixth embodiment.
Figure 9B:
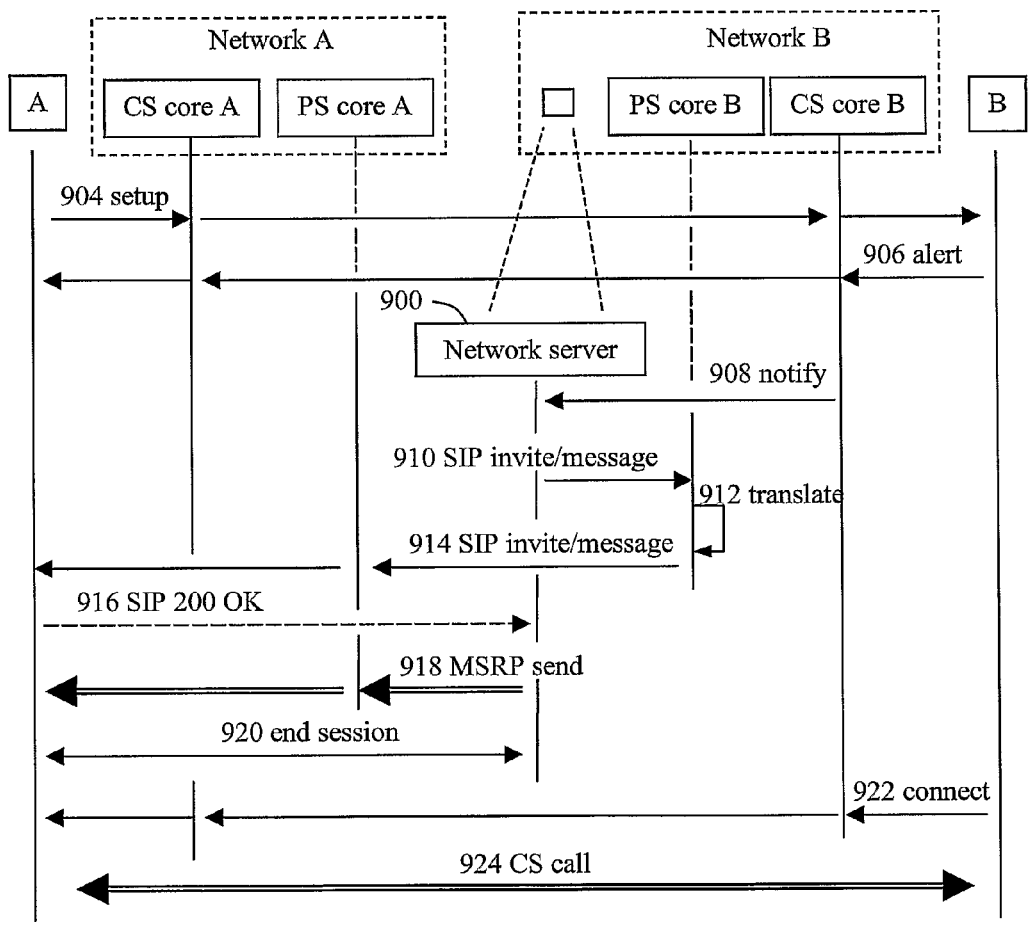
FIG. 9b is a signalling diagram illustrating a call-setup procedure involving a ring-back feature, according to the sixth embodiment.

FIG. 9*b* is a signalling diagram according to the sixth embodiment. The first steps 904 and 906 of initiating an ordinary CS voice call-setup between A and B, i.e. the first communication session, are much the same as steps 404 and 406, respectively, in the first embodiment. However, in this embodiment, when CS core B receives the CS setup message in step 904, it notifies the network server 900 about the incoming CS call by sending a suitable call notification message in a step 908. The network server may then determine that a ring-back presentation is to be provided, and therefore establishes a packet-switched second communication session with terminal A. The network server 900 may then send either an SIP MESSAGE for delivering a text string embedded in the message, or an SIP INVITE for delivering an image, a clip or other type of file, directed to the telephone number of A, in a next step 910.

Similar to step 410 in the first embodiment, the telephone number of terminal A, which was given in the setup message of step 704, is translated by PS core B into a valid SIP URL, in a step 912, and the SIP MESSAGE or INVITE from network server is sent from PS core B to terminal A over PS core A, in a following step 914. Receiving the SIP MESSAGE or INVITE, terminal A may prompt its user for acceptance, or accept the ring-back presentation automatically, as described in earlier embodiments. The session invitation is somehow accepted, and terminal A responds in a next step 916 by sending "SIP 200OK" over PS cores A and B to network server 900.

If an SIP INVITE was sent in steps 910 and 912, the media content of the ring-back presentation can now be transmitted in a step 918 from network server 900 to terminal A over PS cores B and A, contained in an MSRP SEND message, thereby providing the ring-back presentation to A. The second session is then completed by a conventional end session procedure indicated by a general step 920. If the media content of the ring-back presentation is wholly provided in an SIP MESSAGE in steps 910 and 912, steps 918 and 920 will of course be omitted.

Finally, if the B-user at some point answers the call, terminal B will send a connect message to terminal A over CS core B and CS core A in a step 922, and the first session can be executed in a step 924, just like steps 424 and 426 in embodiment 1. As in the previous embodiments, the playing/displaying of presentation content may still continue in terminal A during the call.

The above-described embodiments 1-6 make up just a few examples of how a ring-back presentation can be provided to a calling terminal, and various modifications thereof are possible without departing from the present invention. For example, a described circuit-switched first communication session may just as well be a packet-switched session instead, and vice versa. The specific messages described are generally taken from the SIP protocol, but other corresponding messages may also be used for other protocols, etc. The solution of using an agent 802 to emulate a terminal as described in the fifth embodiment of FIG. 8*a,b* can also be applied in the sixth embodiment of FIG. 9*a,b*. In the sixth embodiment of FIG. 9*a,b*, an RTSP server can be used instead of the described network server 900, and in that case, an SIP MESSAGE in steps 910 and 914 may contain the network address of the RTSP server such that terminal B can download the presentation content therefrom, as similar to steps 716, 718, 724 and 726 in the fourth embodiment of FIG. 7*a,b*.

As mentioned earlier in this description, some measures may be taken to alert the A-user on the start of a ring-back presentation, and also when the B-user answers. The playout of a video clip at terminal A may go at least partly unobserved if the A-user is not using a hands-free equipment or does not look at the terminal display during the call set-up. On the other hand, when enjoying e.g. a visual greeting, the A-user may not immediately hear when the B-party answers. These situations can be avoided as follows.

Firstly, during the call setup before the B-user has answered, incoming SIP signalling to terminal A over a parallel PS bearer of the second session may be checked to determine whether it relates to the first session currently being established. For example, terminal A may compare the origination address for the incoming signal with the B-number/B-address for the call under establishment. If these addresses match, terminal A can be programmed to activate an audio or vibration indication to inform the A-user that a visual ring-back presentation is being received. In a more straightforward alternative, terminal A activates the indication unconditionally whenever an SIP INVITE or an SIP MESSAGE is received.

Secondly, when enjoying a visual presentation (e.g., a video clip), the A-user may not immediate hear when the B-party answers. Also, even if the answer was heard, he/she may want to continue watching a video greeting to the end. A specific alerting function could be programmed in terminal A to indicate that as well, e.g. some visible indication on the screen or a vibration. It is also possible to simply interrupt the playout/displaying of the Presentation upon answer.

Thus, a solution is provided that enables selection of a great range of media types as a ring-back presentation to waiting callers, by using a separate second PS-based communication session in addition to a first session being set up. Calling terminal users can also control the playing of ring-back video and/or audio sequences or the displaying of an image or the like, and decide when to stop it, regardless of when the call is actually answered.

While the invention has been described with reference to specific exemplary embodiments, the description is in general only intended to illustrate the inventive concept and should not be taken as limiting the scope of the invention, which is defined by the appended claims.

The invention claimed is:

1. A method of providing a ring-back presentation to a calling terminal after receiving a call setup request from the calling terminal (A) for a first communication session with a called terminal (B), comprising the following steps:
   executing a call-setup for the first communication session,
   establishing a packet-based second communication session with the calling terminal, independent of the call-setup for the first session, by the called terminal sending a session initiating message directed to the calling terminal, and
   providing pre-defined media content representing said ring-back presentation to the calling terminal, by means of said second session; and
   Wherein said pre-defined media content has been stored in the called terminal and is sent therefrom to the cal ins terminal during the second session.

2. The method according to claim 1, wherein the media content is provided to the calling terminal as at least one file transferred from the called terminal during the second session.

3. The method according to claim 1, wherein the media content is provided to the calling terminal as a text string embedded in a session initiating message from the called terminal for the second session.

4. The method according to claim 1, wherein the pre-defined media content at least includes visual media.

5. The method according to claim 1, wherein an audio or vibration indication is activated at the calling terminal to inform its user that said ring-back presentation is being received.

6. The method according to claim 5, wherein said indication is activated when determining that incoming signalling to terminal A over a parallel packet-switched bearer of the second session relates to the first session currently being established, or is activated in response to receiving the session initiating message.

7. The method according to claim 1, wherein a visual or vibration indication is activated at the calling terminal to inform its user that the call has been answered.

8. The method according to claim 1, wherein 10 different ring-back presentations have been defined for different potential callers, and/or depending on the current date or time of the day, week or season, and/or depending on a user status.

9. The method according to claim 1, wherein standardised SIP messages are used for handling the second communication session.

10. An arrangement for providing a ring-back presentation to a calling terminal after receiving a call setup request from the calling terminal (A) for a first communication session with a called terminal (B), comprising:
    means for executing a call-setup for the first communication session,
    means for establishing a second packet-based communication session with the calling terminal, independent of the call-setup for the first session, by
    the called terminal sending a session initiating message directed to the calling terminal, and
    means for providing pre-defined media content representing said ring-back presentation to the calling terminal, by means of said second session; and
    wherein the called terminal is adapted to store said pre-defined media content and to send it to the calling terminal during the second session.

11. The arrangement according to claim 10, wherein the called terminal is further adapted to provide the media content to the calling terminal by transferring at least one file during the second session.

12. The arrangement according to claim 10, wherein the called terminal is further adapted to provide the media content to the calling terminal as a text string embedded in a session initiating message for the second session.

13. The arrangement according to claim 10, wherein the pre-defined media content at least includes visual media.

14. The arrangement according to claim 10, wherein the calling terminal is adapted to activate an audio or vibration indication to inform its user that said ringback presentation is being received.

15. The arrangement according to claim 14, wherein the calling terminal is further adapted to activate said indication by determining that incoming signalling to terminal A over a parallel packet-switched bearer of the second session relates to the first session currently being established, or to activate the indication in response to receiving the session initiating message.

16. The arrangement according to claim 10, wherein the calling terminal is adapted to activate a visual or vibration indication to inform its user that the call has been answered.

17. The arrangement according to claim 10, further comprising means for defining different ring-back presentations for different potential callers, and/or depending on the current date or time of the day, week or season, and/or depending on a user status.

18. A method of providing a ring-back presentation to a calling terminal after receiving a call setup request from the calling terminal (A) for a first communication session with a called terminal (B), comprising the following steps:
    executing a call-setup for the first communication session,
    establishing a packet-based second communication session with the calling terminal, independent of the call-setup for the first session, by the called terminal sending a session initiating message directed to the calling terminal, and
    providing pre-defined media content representing said ring-back presentation to the calling terminal, by means of said second session;
    wherein said pre-defined media content has been stored in a server and is retrieved therefrom for delivery to the calling terminal by means of the second session;

wherein said server is a media server, and an agent fetches the media content from the media server and delivers it to the calling terminal during the second session;

wherein the called terminal sends a session initiating message towards the calling terminal for the second session, and said agent modifies the session initiating message to indicate itself as the sender before sending it to the calling terminal; and wherein, when receiving an acknowledgment message from the calling terminal in response to the modified session initiating message, the agent modifies the acknowledgment message from terminal A to indicate that the session invitation is rejected and also to indicate itself as the sender of the message, and sends the modified reject message to the called terminal.

19. An arrangement for providing a ring-back presentation to a calling terminal after receiving a call setup request from the calling terminal (A) for a first communication session with a called terminal (B), comprising:

means for executing a call-setup for the first communication session;

means for establishing a second packet-based communication session with the calling terminal, independent of the call-setup for the first session, by the called terminal sending a session initiating message directed to the calling terminal;

means for providing pre-defined media content representing said ring-back presentation to the calling terminal, by means of said second session;

a server in which said pre-defined media content has been stored, the server being adapted to deliver the media content to the calling terminal by means of the second session;

wherein said server is a media server and said arrangement further includes an agent adapted to fetch the media content from the media server and to deliver it to the calling terminal during the second session;

wherein the called terminal is adapted to send a session initiating message towards the calling terminal for the second session, and said agent is adapted to modify the session initiating message to indicate itself as the sender before sending it to the calling terminal; and wherein, when receiving an acknowledgment message from the calling terminal in response to the modified session initiating message, the agent is adapted to modify the acknowledgment message from terminal A to indicate that the session invitation is rejected and also to indicate itself as the sender of the message, and to send the modified reject message to the called terminal.

* * * * *

UNITED STATES PATENT AND TRADEMARK OFFICE
CERTIFICATE OF CORRECTION

PATENT NO. : 8,687,787 B2
APPLICATION NO. : 11/917524
DATED : April 1, 2014
INVENTOR(S) : Stille et al.

Page 1 of 1

It is certified that error appears in the above-identified patent and that said Letters Patent is hereby corrected as shown below:

In the Claims

In Column 17, Line 38, in Claim 1, delete "Wherein" and insert -- wherein --, therefor.

In Column 17, Line 39, in Claim 1, delete "cal ins" and insert -- calling --, therefor.

In Column 18, Line 35, in Claim 14, delete "ringback" and insert -- ring-back --, therefor.

Signed and Sealed this
Eighth Day of July, 2014

Michelle K. Lee
*Deputy Director of the United States Patent and Trademark Office*